(12) United States Patent
Morgan et al.

(10) Patent No.: US 11,833,875 B2
(45) Date of Patent: Dec. 5, 2023

(54) MOTOR-VEHICLE WITH MULTI-MODE EXTREME TRAVEL SUSPENSION—GROUND PLANE DETECTION AND CONTROL

(71) Applicant: PRATT & MILLER ENGINEERING AND FABRICATION, INC., New Hudson, MI (US)

(72) Inventors: Christopher M. Morgan, Ann Arbor, MI (US); John Edward Ustick, Bloomfield Hills, MI (US); Guido Francesco Ritelli, Farmington Hills, MI (US)

(73) Assignee: PRATT & MILLER ENGINEERING AND FABRICATION, LLC, New Hudson, MI (US)

( * ) Notice: Subject to any disclaimer, the term of this patent is extended or adjusted under 35 U.S.C. 154(b) by 643 days.

(21) Appl. No.: 17/048,971

(22) PCT Filed: Apr. 19, 2019

(86) PCT No.: PCT/US2019/028309
§ 371 (c)(1),
(2) Date: Oct. 19, 2020

(87) PCT Pub. No.: WO2019/204717
PCT Pub. Date: Oct. 24, 2019

(65) Prior Publication Data
US 2021/0252932 A1    Aug. 19, 2021

Related U.S. Application Data

(60) Provisional application No. 62/660,430, filed on Apr. 20, 2018.

(51) Int. Cl.
*B60G 17/0165* (2006.01)
*B60G 7/00* (2006.01)

(52) U.S. Cl.
CPC ......... *B60G 17/0165* (2013.01); *B60G 7/001* (2013.01); *B60G 2400/0511* (2013.01);
(Continued)

(58) Field of Classification Search
CPC ..... B60G 17/0165; A01C 7/006; E02F 9/264; G06V 20/56; A01D 33/14; A01D 34/62;
(Continued)

(56) References Cited

U.S. PATENT DOCUMENTS

| 4,869,054 | A | * | 9/1989 | Hostetler | ............. | A01D 34/866 56/16.2 |
| 5,085,042 | A | * | 2/1992 | Lansdowne | ............. | A01D 75/28 280/6.154 |

(Continued)

FOREIGN PATENT DOCUMENTS

| ES | 2 063 683 | A2 | 1/1995 |
| FR | 2 700 501 | A1 | 7/1994 |
| WO | 2017056926 | A1 | 4/2017 |

OTHER PUBLICATIONS

European Search Report and Opinion of EP 19 78 8556, dated Dec. 22, 2021.
(Continued)

*Primary Examiner* — Yuri Kan
(74) *Attorney, Agent, or Firm* — DICKINSON WRIGHT PLLC

(57) ABSTRACT

A ground plane detection system for a motor vehicle and a motor vehicle with enhanced maneuverability characteristics of a type including a frame structure, a pair of front road engaging wheels, a pair of rear road engaging wheels. The detection system includes, a body controller configured for determining a ground plane including receiving at least one of a GPS signal and an inertial navigation system signal. The body controller is further configured for providing a roll and
(Continued)

a pitch signal with respect to the ground plane; and the body controller combining the signals with inputs from one or more sensors detecting displacement of the front and rear road engaging wheels. The body controller is also configured to determine a terrain plane reference to the ground plane, and providing control signals to cause the vehicle to undertake an earth level orientation mode or a terrain following orientation mode.

20 Claims, 8 Drawing Sheets

(52) U.S. Cl.
CPC .. *B60G 2400/0512* (2013.01); *B60G 2400/82* (2013.01); *B60G 2401/16* (2013.01)

(58) Field of Classification Search
CPC .... A01D 75/28; A01D 34/866; G01N 21/359; B62D 57/032; G01S 7/4802; G01S 7/024; G06F 3/011
See application file for complete search history.

(56) References Cited

U.S. PATENT DOCUMENTS

| | | | | |
|---|---|---|---|---|
| 5,161,353 | A * | 11/1992 | Bergkamp | A01D 75/28 |
| | | | | D15/15 |
| 5,552,787 | A * | 9/1996 | Schuler | G01S 7/024 |
| | | | | 342/191 |
| 5,950,409 | A * | 9/1999 | Davies | A01D 34/62 |
| | | | | 56/DIG. 10 |
| 6,131,919 | A | 10/2000 | Lee et al. | |
| 6,684,140 | B2 | 1/2004 | Lu | |
| 6,714,851 | B2 | 3/2004 | Hrovat et al. | |
| 6,754,584 | B2 | 6/2004 | Pinto et al. | |
| 7,339,340 | B2 * | 3/2008 | Summer | B62D 57/032 |
| | | | | 700/254 |
| 7,427,072 | B2 | 9/2008 | Brown | |
| 8,376,077 | B2 | 2/2013 | Venton-Walters | |
| 9,403,415 | B2 | 8/2016 | Lu et al. | |
| 10,906,601 | B2 | 2/2021 | Aoki et al. | |
| 2001/0040572 | A1 * | 11/2001 | Bradski | G06F 3/011 |
| | | | | 345/419 |
| 2003/0125858 | A1 | 7/2003 | Lin et al. | |
| 2003/0236603 | A1 | 12/2003 | Lu | |
| 2005/0024492 | A1 * | 2/2005 | Schaefer | G01S 7/4802 |
| | | | | 701/28 |
| 2008/0284118 | A1 | 11/2008 | Venton-Walters | |
| 2011/0087398 | A1 | 4/2011 | Lu et al. | |
| 2011/0106451 | A1 * | 5/2011 | Christy | G01N 21/359 |
| | | | | 702/5 |
| 2011/0114409 | A1 | 5/2011 | Venton-Walters | |
| 2012/0095654 | A1 * | 4/2012 | Miller | A01D 33/14 |
| | | | | 701/50 |
| 2014/0247352 | A1 * | 9/2014 | Rathi | G06V 20/56 |
| | | | | 348/148 |
| 2018/0281878 | A1 | 10/2018 | Aoki et al. | |
| 2019/0150359 | A1 * | 5/2019 | Gust | A01D 34/863 |
| 2019/0218744 | A1 * | 7/2019 | Izumikawa | E02F 9/264 |
| 2020/0221629 | A1 * | 7/2020 | Martin | A01C 7/006 |

OTHER PUBLICATIONS

International Search Report and Written Opinion of PCT/US2019/028309, filed Apr. 19, 2019.

* cited by examiner

MOTOR-VEHICLE WITH MULTI-MODE EXTREME TRAVEL SUSPENSION—GROUND PLANE DETECTION AND CONTROL

CROSS-REFERENCE TO RELATED APPLICATIONS

This application is a 35 U.S.C. § 371 national phase of PCT International Application No. PCT/US2019/028309, filed Apr. 19, 2019, which claims the benefit of priority under 35 U.S.C. § 119 to U.S. Provisional Application No. 62/660,430, filed Apr. 20, 2018, the contents of which are incorporated herein by reference in their entirety.

STATEMENT OF GOVERNMENT SUPPORT

This invention was made with government support under Contract Number: D16PC00029, awarded by DARPA. The United States Government has certain rights in the invention.

FIELD OF THE INVENTION

This invention relates to a motor vehicle especially for off-road and military applications having a multi-mode extreme travel suspension, along with other innovative features. More particularly, the invention relates to vehicle suspension control systems that provide various modes of travel for such a vehicle.

BACKGROUND

There are applications for off-road vehicles requiring high degrees of mobility, speed, agility, obstacle avoidance and further having extreme terrain maneuvering capabilities. A vehicle having such capabilities may be well suited for certain military, commercial and recreational applications. The present invention relates to such a vehicle having the above mentioned capabilities.

For the operation of such vehicles particularly when maneuvering in highly variable terrain, a system for the detection of a ground plane is desired. In certain of these applications it is desirable to have the vehicle while negotiating extreme terrain to maintain the vehicle body in a generally level condition, in other words aligned with gravity ("earth level"). In this mode the vehicle will maintain a generally level body with respect to gravity despite articulation of the suspension units and the ground engaging wheels. Of course the ability to maintain such an orientation has certain constraints associated with the travel and control limits of the suspension system. For a military application, an earth level orientation may be desirable to best operate sensors or detection components generally, and may also be desirable from the standpoint of operator comfort. In addition such an earth level orientation may be desirable for aiming or positioning of weapon and/or sensing systems. There may be other operating conditions in which it is more desired to have the vehicle chassis during travel to approximate the contour of terrain conditions including instances where one side of the vehicle is considerably higher or lower than another side (side hill), or where the vehicle negotiates steep climbs or descents (or when traveling over mixed terrain features). By maintaining the vehicle aligned with the terrain ("terrain following") while traveling, enhanced comfort may be provided and may also enable the vehicle to negotiate extremely rough terrain where the limits of travel of the suspension system components are challenged. For a vehicle having such a dual mode capabilities it would be desirable to enable the operator to control vehicle attitudes between such modes of operation.

Ground vehicles with active suspension systems are typically configured to control the sprung mass, and roll and pitch angles based on measurements of wheel displacement at each wheel station. In this way, the vehicle follows the roll and pitch of the terrain over which it operates. For vehicles with conventional vehicle suspension systems, which typically have 12 inches or less of suspension travel, this ensures that there is enough wheel displacement to absorb local terrain disturbances as the vehicle moves. However, as suggested above, for vehicles with very high travel active suspension systems, it may be advantageous to keep the roll angle, pitch angle or both level with respect to gravity rather than terrain following with respect to the ground surface.

SUMMARY

In accordance with the present invention, a motor vehicle with a multi-mode extreme travel suspension system is described. This invention relates to systems including mechanisms for ground plane detection. In addition to detecting a ground plane, the system in accordance with embodiments of the present invention allow the vehicle to maneuver in at least either of two modes, including an earth level mode and a terrain following mode, with further variations between those conditions.

Embodiments of the present invention includes an approach by which; first, the ground plane normal is estimated by combining measured suspension displacements with a measured or estimated body roll and pitch angles with respect to gravity; second, an approach by which the vehicle operator specifies the degree to which the vehicle should attempt to adjust to either approach; and third, an approach to control a vehicle attitude based on the driver inputs.

DETAILED DESCRIPTION

Figure 1:
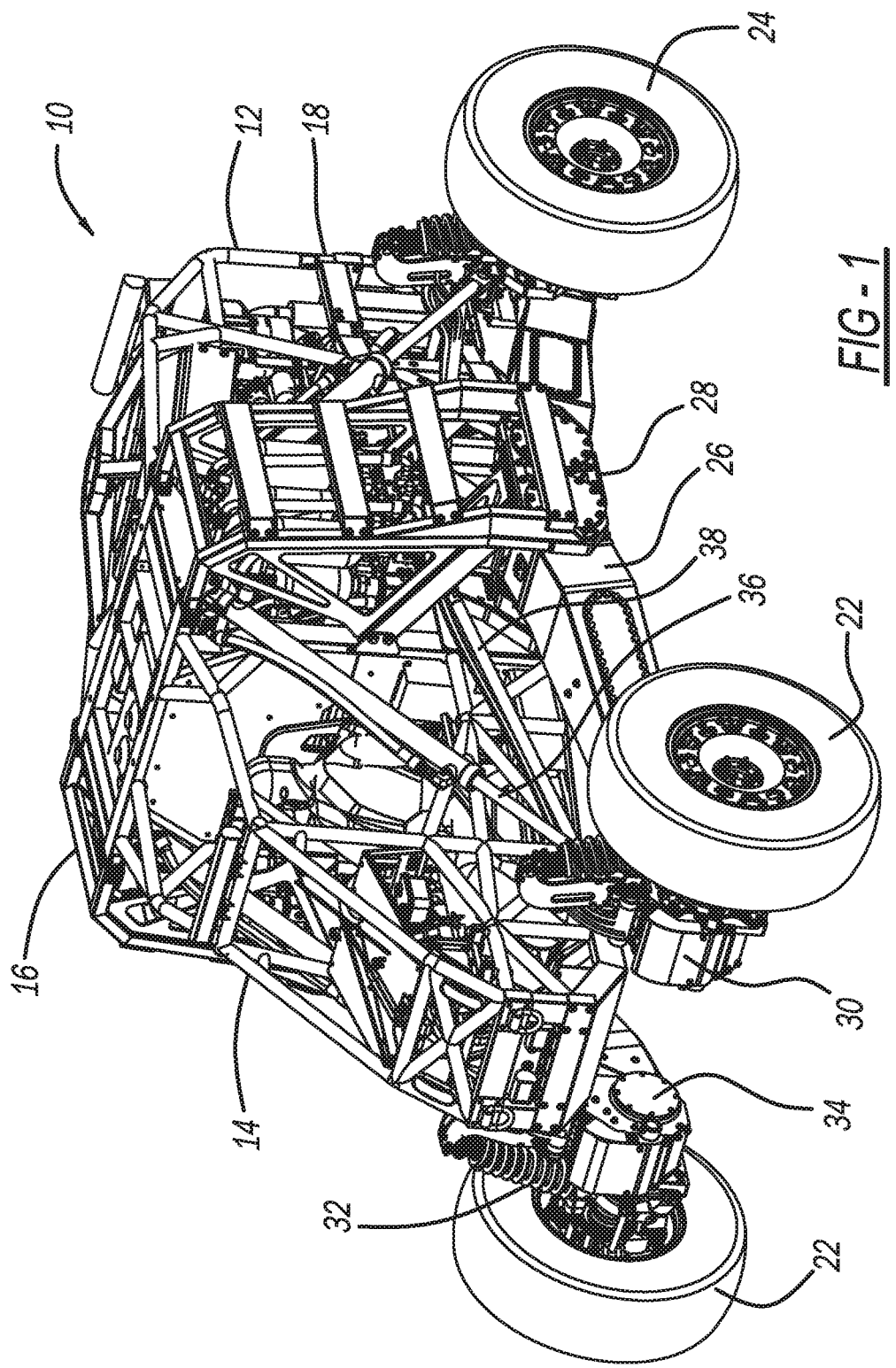
FIG. 1 provides a front isometric view of the basic vehicle which may employ features in accordance with this invention, shown with exterior body panels removed.
Figure 2:
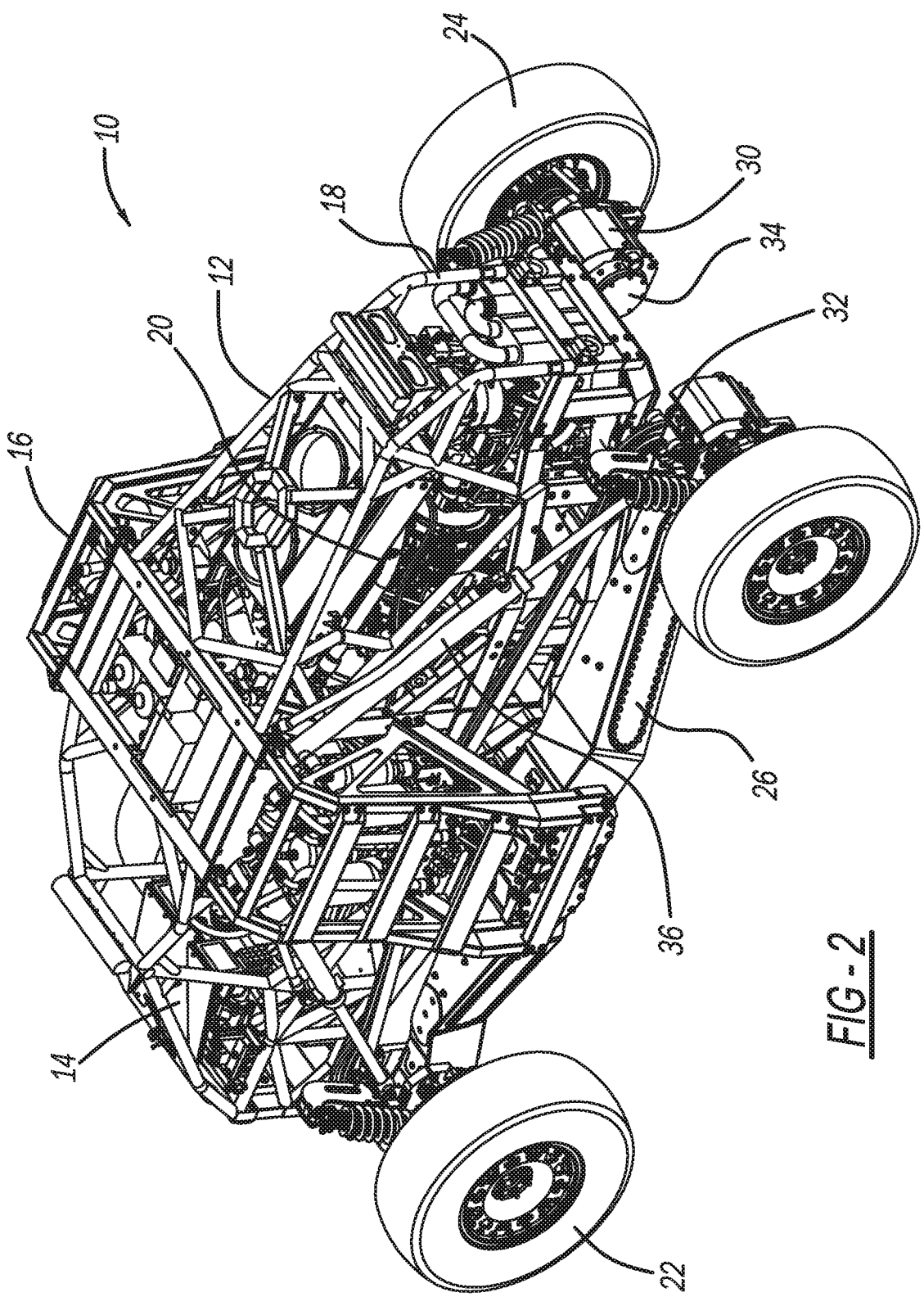
FIG. 2 provides a rear isometric view of the basic vehicle which may employ features in accordance with this invention, shown with exterior body panels removed.
Figure 3A:
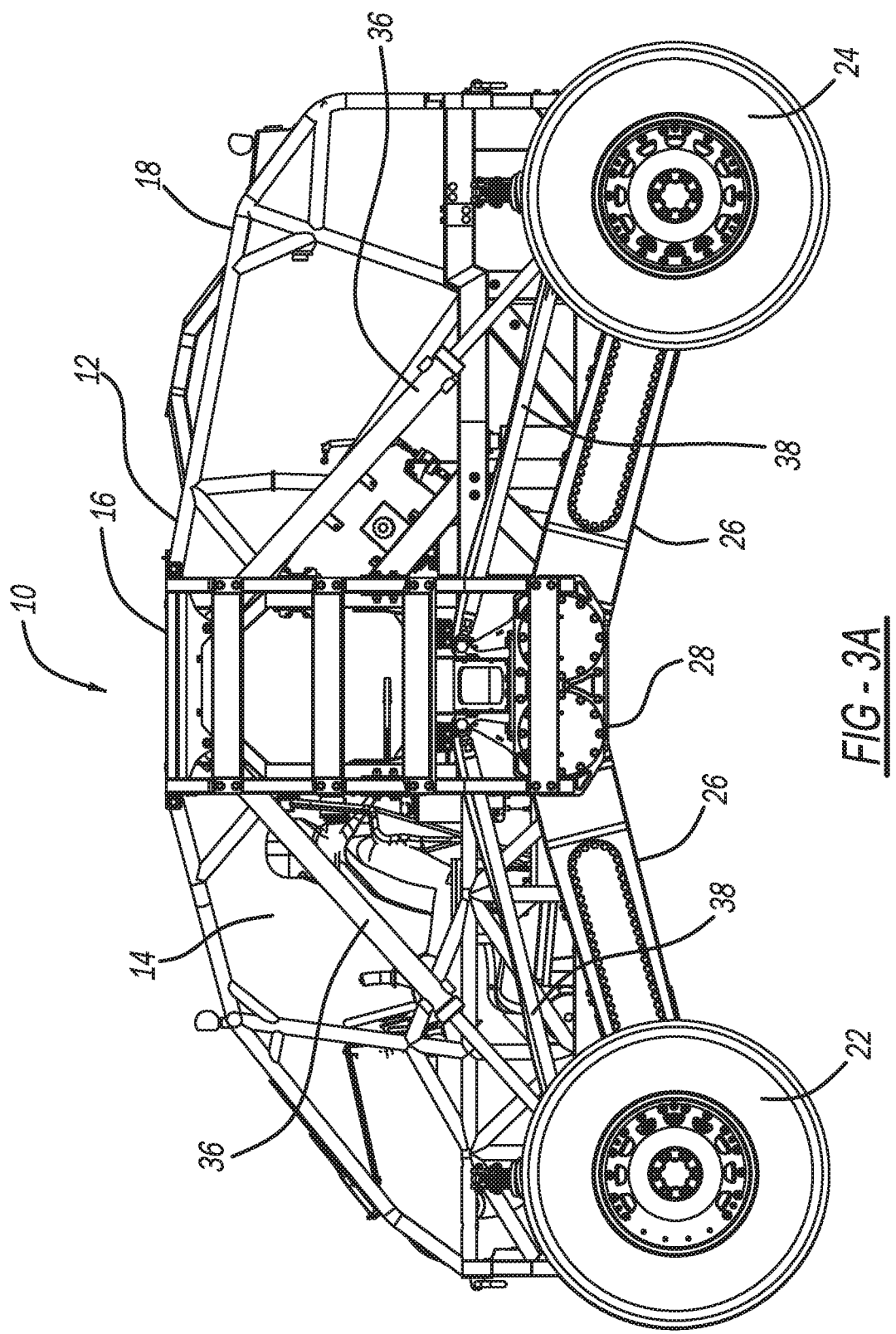
FIGS. 3A and 3B provide side and rear views respectively of the basic vehicle.
Figure 3B:
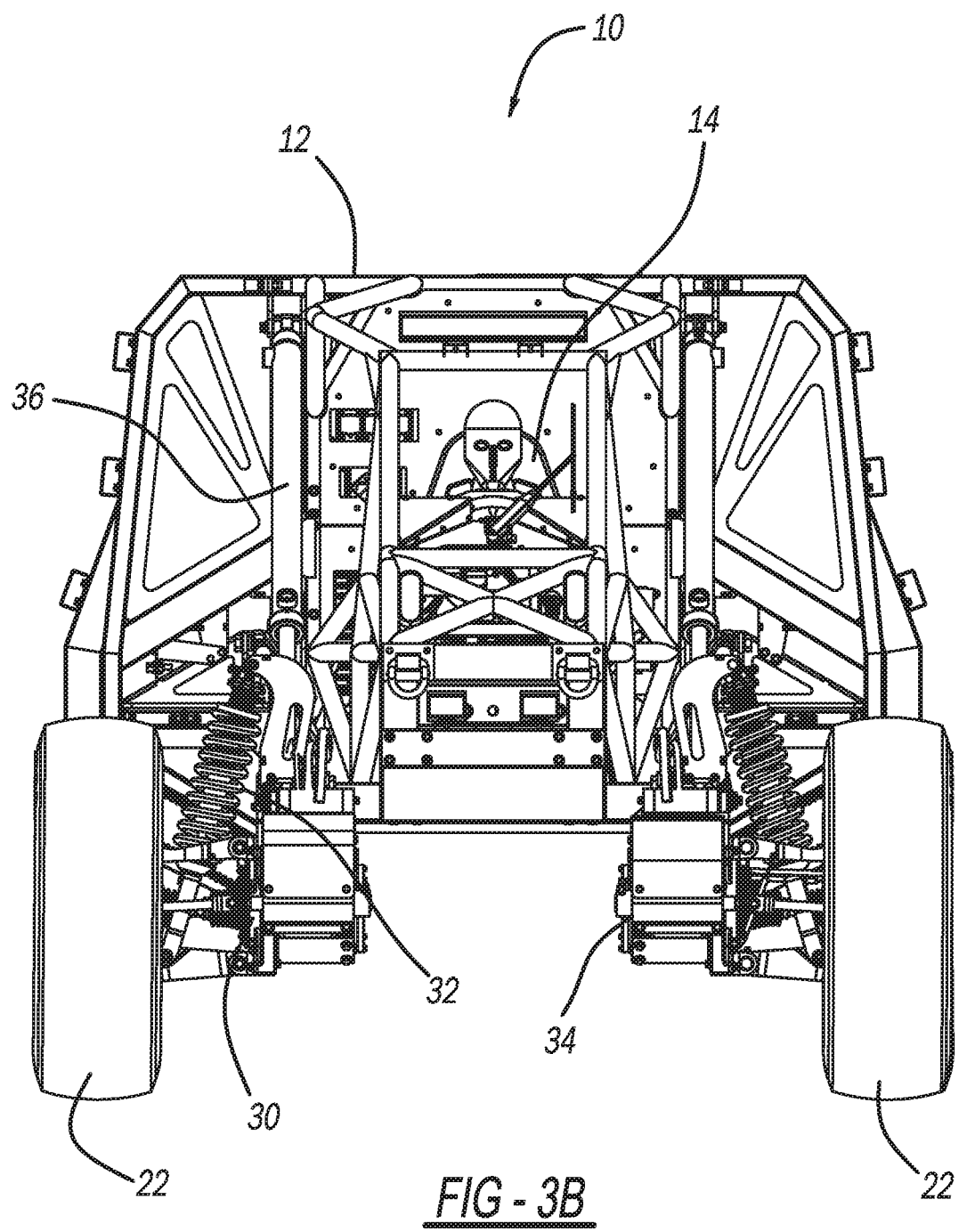
Figure 4:
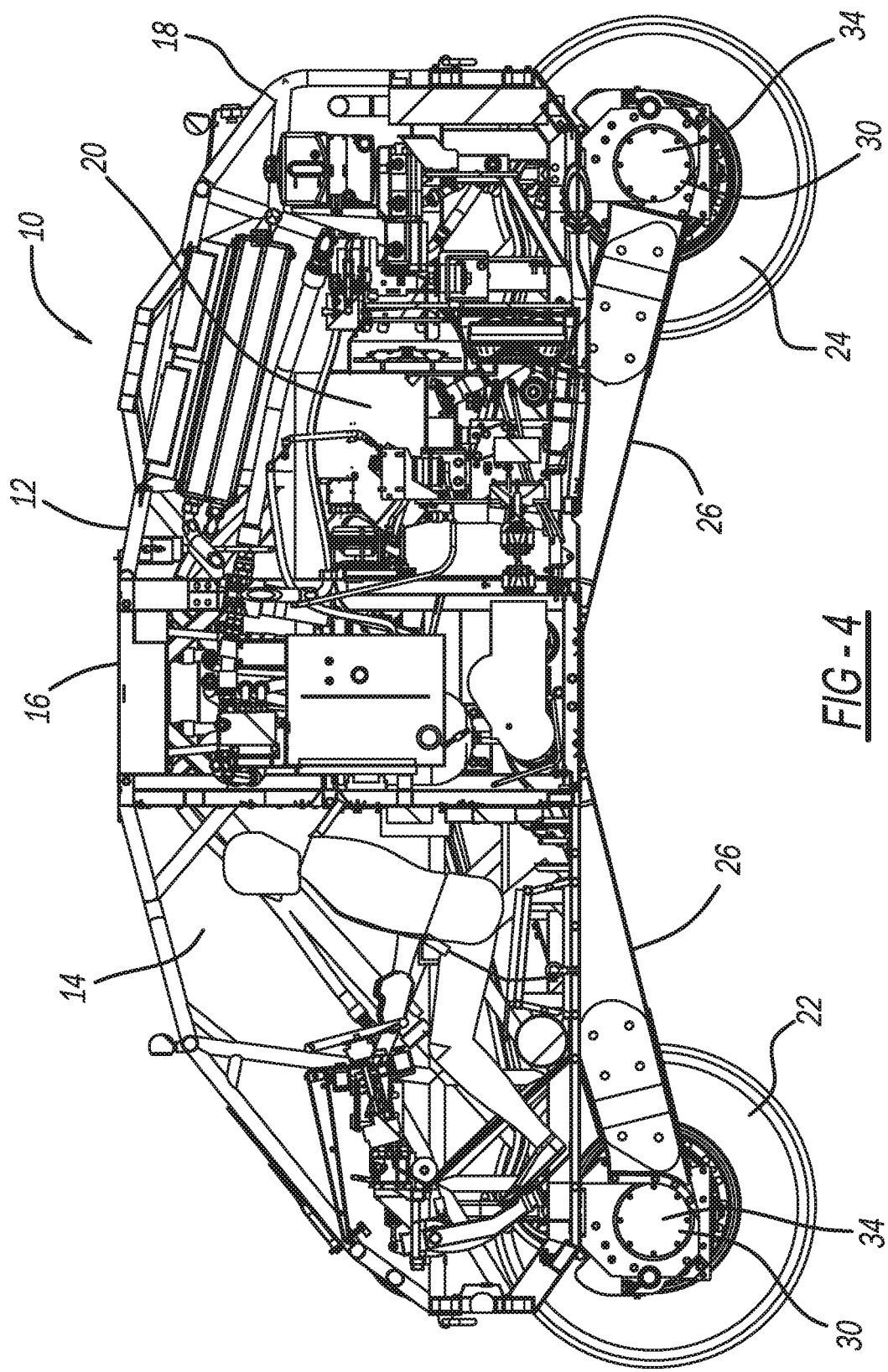
FIG. 4 shows the front vehicle layout in a longitudinal center cut section.

With reference to FIGS. 1-5, basic features of vehicle 10 are illustrated. Vehicle 10 is only one example of a vehicle type which may implement the suspension system and characteristics of the present invention. Exterior tube type frame structure 12 structurally supports the main components of vehicle 10. The driver compartment 14 is placed at the forward section of the vehicle. Main hydraulic and electrical control systems are positioned within center section 16, and rear compartment 18 houses engine 20. Front and rear pairs of a ground engaging wheels 22 and 24, respectively are provided.

Each of the four suspension corners of vehicle 10 have generally similar arrangements except that the suspension component dimensions between the front and rear wheel sets 22 and 24 differ. Again referring to FIGS. 1-5, a front left-hand corner unit will be described. Long suspension arm 26 pivots about a bearing 28 located at the lower portion of vehicle center section 16. A wheel end unit 30 is mounted to the end of long suspension arm 26. Wheel end unit 30 includes a linear suspension elements in the form of strut 32 which is shown as a coil over shock type arrangement. In one embodiment of the present invention, strut 32 is a passive suspension element having internal spring rate and damping characteristics which may be tailored in the compression and rebound motion direction. Strut 32 could also be provided as an active or semi-active type having variable damping characteristics. Drive hub 34 is provided at each of the wheel corners for transmitting power through a propeller shaft (not shown) housed within the hollow interior cavity of long suspension arm 26 and geared to wheel drive hubs 34. Hydraulic cylinder 36 provides a long a stroke capability for enabling an extreme range of travel for each of the wheel end units 30. Hydraulic cylinder 36 is controlled by a hydraulic circuit which provides the desirable suspension characteristics of the present invention. As an example embodiment of the present invention, the high travel suspension provided for vehicle 10 is capable of jounce (upward) displacement on the order of 42 inches with 30 inches of rebound (downward) movement from a nominal static condition. The suspension strut 32 can provide displacement for example in the range of ±4 inches of additional travel. Steering link arms 38 are provided for controlling steering articulation of each of the four wheels of the vehicle.

Figure 5:
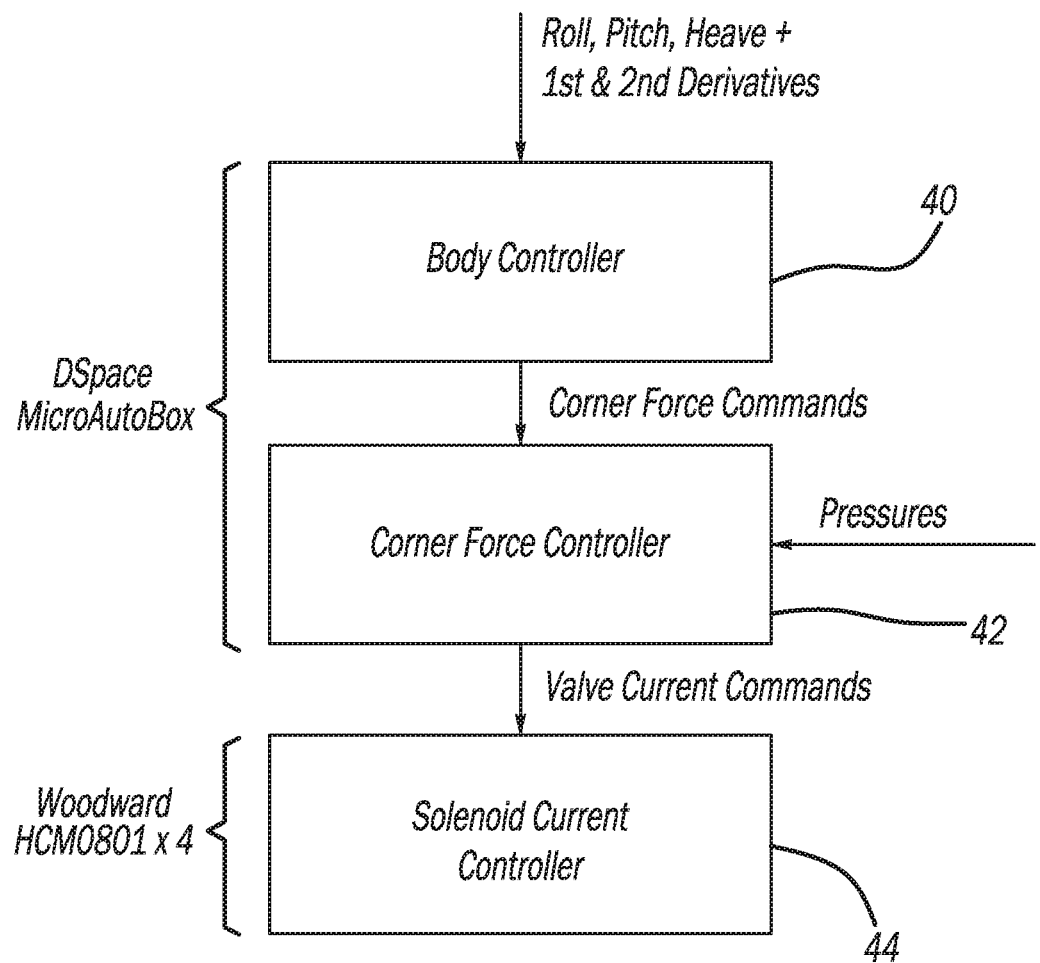
FIG. 5 is a schematic diagram of a control hardware system.

FIG. 5 provides a schematic illustration of certain electronic control hardware components which are implemented to control suspension system motion in accordance with the present invention. As illustrated, body controller 40 receives signals and user inputs as well as potentially GPS and inertial sensor inputs with other sensors providing information useful for vehicle dynamics. Body controller 40 determines desired corner forces for each wheel end unit 32 based on chassis dynamics states. These corner forces are the forces exerted by the ground engaging wheels 22 and 24 against a ground contact patch at each wheel position. Signals from body controller 40 are fed to corner force controller 42 which translates instructions from the body controller into control signals for controlling vehicle suspension systems. Corner force controller 42 attempts to achieve desired forces within hydraulic and suspension system limits. These signals are in turn used to create solenoid current control signals via a solenoid current controller 44 which is capable of commanding hydraulic circuit elements such as proportional spool valves to cause the suspension components to undergo desired displacements. It is noted that corner force controller 42 indicates control based on corner force which is related to displacements based on vehicle mass, configuration, present state, and dynamic factors. In a preferred embodiment of the present invention, body controller 40 receives operator inputs as to desired body control mode including an earth level mode, a terrain following mode, or blends of these modes.

Body controller 40 also enables algorithms and control techniques which combine with hardware components to estimate the orientation of a ground plane over which the vehicle 10 is operated. Body controller 40 receives, among other inputs, GPS and/or inertial navigation system (INS) inputs which provide roll and pitch state signals with respect to the earth level orientation.

Figure 6:
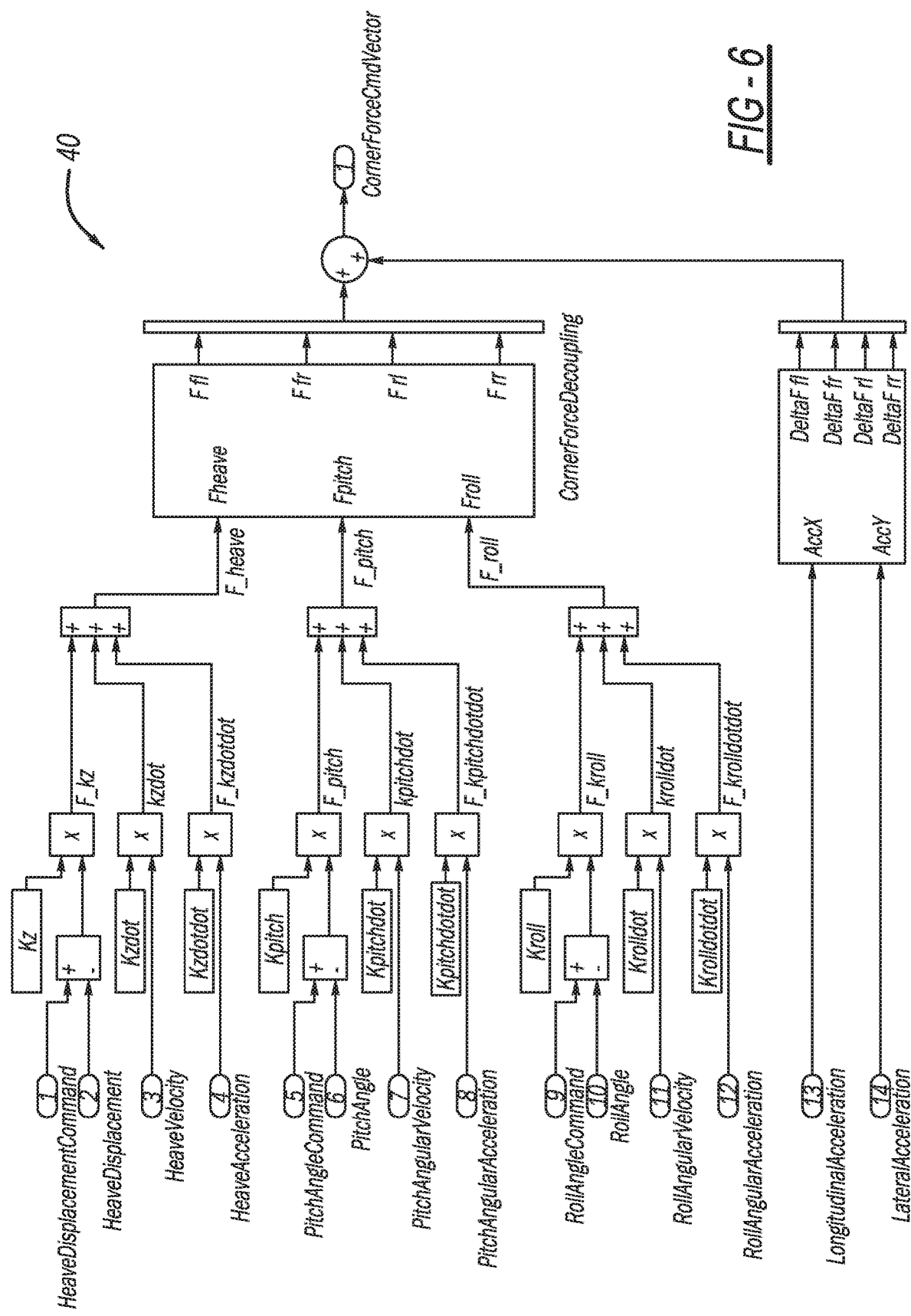
FIG. 6 provides a more detail description of the body control system showing sensor inputs and logic architecture.

FIG. 6 provides an illustration of the logic architecture for body controller 40. As indicated controller 40 receives inputs from numerous sensors related to vehicle component states and inertial parameters. The system provides full state feedback to determine heave/pitch/roll force and moment targets for vehicle suspension components. Geometric relationships are used based on track width and wheelbase of vehicle 10 and transforms chassis force/moment targets into corner force targets for each of the wheel end units 32. These commands are executed via corner force controller 42. Corner force parameters are directly related to displacements of wheel end units 32 relative to the vehicle frame and permit the control of the various operating modes described herein.

Figure 7:
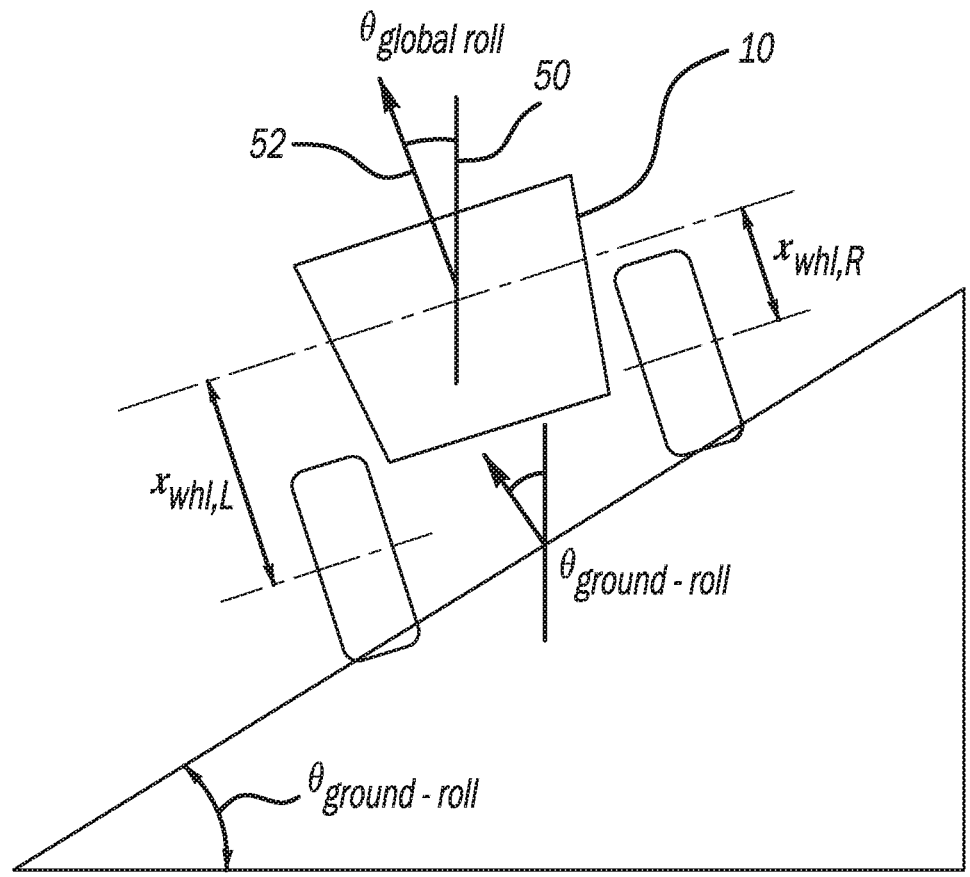
FIG. 7 provides an illustration of theoretical factors for establishing a ground plane for a vehicle.

FIG. 7 illustrates schematically vehicle 10 negotiating a terrain with a highly side sloped surface defining side angle $\theta_{ground\text{-}roll}$ (designating this component in the roll axis). Of course this is a highly idealized configuration in which the terrain exhibits a planar configuration which would certainly not be the case in actual vehicle operations. However, side angle $\theta_{ground\text{-}roll}$ can be regarded as an approximation of the terrain surface at a particular point of operation in the area covered by the vehicle. A side view of vehicle 10 would reveal a grade or pitch angle θground-pitch with respect to gravity normal but in another orthogonal view. As illustrated, side angle $\theta_{ground\text{-}roll}$ also defines the angular separation between ground level normal, designated by ground-vertical line 50 and the side angle $\theta_{ground\text{-}roll}$. As diagrammatically illustrated, front and rear wheels 22 and 24 are articulated to position the vehicle chassis at a particular orientation designated by reference line 52, in this example, producing a global roll angle $\theta_{roll}$. If $\theta_{roll}$ is equal to side angle $\theta_{ground\text{-}roll}$ this represents a terrain following orientation, or if angle $\theta_{roll}$ approaches zero, represents terrain following. As mentioned above a similar representation can be made for vehicle 10 in the pitch axis (the yaw axis is related to steering articulation).

In all of the operating modes the system determines an earth fixed vertical orientation or gravity plane (reference to axis 50). Such signals can be combined with known or derived corner suspension displacements to construct an estimate of the ground surface normal. The body controller 40 can be configured to control target roll and/or pitch angles to be earth fixed level or parallel to an estimated ground plane, or somewhere in between. The inputs as to the desired operating mode may be based on human factors consideration or other operational or component features as outlined previously. In addition to a selection between earth level and terrain following orientation, a hybrid control arrangement may also be provided. For example, it may be desirable to approximate the terrain plane with respect to the roll axis of the vehicle while its pitch axis may be controlled differently, for example, based on an earth fixed level condition. Another hybrid arrangement would have the pitch axis be terrain following with the roll axis earth fixed level, or vice versa. These variations suggest opportunities for the variations mentioned previously.

It should be noted that in actual operation of vehicle 10 over rough terrain it is not possible to maintain theoretical precise orientations in the earth level and terrain following modes. The dynamic characteristics and frequency of terrain feature changes coupled with the presence of a passive or semi-active suspension strut 32 mean that there is a degree of compliance and lag in the system. However, in operation the system seeks to orient the vehicle in the desired attitude and operational mode.

While the above description constitutes the preferred embodiment of the present invention, it will be appreciated that the invention is susceptible to modification, variation and change without departing from the proper scope and fair meaning of the accompanying claims.

REPRESENTATIVE BACKGROUND ART

U.S. Pat. No. 9,403,415 B2 (LU, J. et al.) Aug. 2, 2016.
U.S. Pat. No. 7,427,072 B2 (BROWN, S N) Sep. 23, 2008.
U.S. Pat. No. 6,754,584 B2 (PINTO, R. et al.) Jun. 22, 2004.
U.S. Pat. No. 6,714,851 B2 (HROVAT, D D. et al.) Mar. 30, 2004.
MARCU, S. et al. Model for the study of active suspensions. IOP Conference Series: Materials Science and Engineering, 2017, Vol. 252, 012032, DOI 10.1088/1757-899X/252/1/012032, pages 1-8.
IKENAGA, S. et al. Active Suspension Control of Ground Vehicle based on a Full-Vehicle Model. Automation & Robotics Research Institute. The University of Texas at Arlington and Davis Technologies International Inc, pages 1-11.
DAWKINS, J J. Model Based Off-Road Terrain Profile Estimation. 2014 American Control Conference (ACC), Jun. 4-6, 2014. Portland, Oregon, USA, 978-1-4799-3274-0, pages 2792-2797.
DAILY, R. et al. The Use of GPS for Vehicle Stability Control Systems. IEEE Transactions on Industrial Electronics, Vol. 51, No. 2, April 2004, 0278-0046/04, pages 270-277.
Suspension Spot. The Incredible Bose Active Suspension System, Jan. 22, 2018, pages 1-4. Retrieved from <https://suspensionspot.com/blogs/news/the-incredible-bose-active-suspension-system>.

The invention claimed is:

1. A ground plane detection system for a vehicle with maneuverability characteristics of a type including a frame structure, a pair of front road engaging wheels, a pair of rear road engaging wheels, the detection system comprising:
a body controller configured for determining a ground plane including receiving at least one of a GPS signal and an inertial navigation system signal, the body controller configured for providing a roll and a pitch signal with respect to the ground plane; and the body controller combining the signals with inputs from one or more sensors detecting displacement of the front and rear road engaging wheels,
the body controller further configured to determine a terrain plane reference to the ground plane, and providing control signals to cause the vehicle to selectively undertake either an earth level orientation mode or a terrain following orientation mode.

2. The ground plane detection system in accordance with claim 1 further comprising the body controller configured to receive an input from an operator of the vehicle commanding the vehicle to undertake either the earth level orientation mode or the terrain following orientation mode.

3. The ground plane detection system in accordance with claim 1 further comprising: the earth level orientation mode seeks to cause the vehicle frame structure to maintain a parallel orientation with respect to the ground plane as the vehicle travels relative to a terrain surface.

4. The ground plane detection system in accordance with claim 1 further comprising: the terrain following orientation mode seeks to cause the vehicle frame structure to maintain a parallel orientation with respect to the terrain plane as the vehicle travels relative to a terrain surface.

5. The ground plane detection system in accordance with claim 1 further comprising: the body controller further configured for providing at least one further mode of vehicle orientation relative to the ground plane and the terrain plane, for positioning the vehicle between positions associated with the earth level orientation mode and the terrain following orientation mode.

6. The ground plane detection system in accordance with claim 1 further comprising: the vehicle further comprising, an active suspension system for the vehicle having at least a pair of road engaging wheels, the suspension system having a suspension actuator coupled with each of the pairs of road engaging wheels.

7. The ground plane detection system in accordance with claim 6 further comprising a high travel suspension arm pivotably connected to the frame structure of the vehicle and coupled to a wheel end unit, the suspension arm coupled with the suspension actuator such of the actuator controls the position of the suspension arm relative to the frame structure.

8. The ground plane detection system in accordance with claim 7 further comprising the vehicle having at least four of the high travel suspension arms and actuators.

9. The ground plane detection system in accordance with claim 8 further comprising: wherein the four high travel suspension arms and actuators are associated with the pairs of front and rear road engaging wheels.

10. The ground plane detection system in accordance with claim 1 further comprising wherein the body controller is configured to undertake one of the earth level orientation mode and the terrain following mode with respect to only one of a roll and pitch axis with the other of the undertaking the other of the earth level orientation mode in the terrain following mode in another of the roll and pitch axes.

11. A motor vehicle comprising the ground plane detection system in accordance with claim 1.

12. A vehicle with maneuverability characteristics, comprising:
a frame structure,
a pair of front road engaging wheels,
a pair of rear road engaging wheels,
a detection system comprising:
a body controller configured for determining a ground plane including receiving at least one of a GPS signal and an inertial navigation system signal, the body controller configured for providing a roll and a pitch signal with respect to the ground plane; and the body controller combining the signals with inputs from one or more sensors detecting displacement of the front and rear road engaging wheels,
the body controller further configured to determine a terrain plane reference to the ground plane, and providing control signals to cause the vehicle to selectively undertake either an earth level orientation mode or a terrain following orientation mode,
the body controller configured to receive an input from an operator of the vehicle commanding the vehicle to undertake either the earth level orientation mode or the terrain following orientation mode.

13. The vehicle in accordance with claim 12 further comprising: the earth level orientation mode seeks to cause the vehicle frame structure to maintain a parallel orientation with respect to the ground plane as the vehicle travels relative to a terrain surface.

14. The vehicle in accordance with claim 12 further comprising: the terrain following orientation mode seeks to cause the vehicle frame structure to maintain a parallel orientation with respect to the terrain plane as the vehicle travels relative to a terrain surface.

15. The vehicle in accordance with claim 12 further comprising: the body controller further configured for providing at least one further mode of vehicle orientation relative to the ground plane and the terrain plane, for positioning the vehicle between positions associated with the earth level orientation mode and the terrain following orientation mode.

16. The vehicle in accordance with claim 12 further comprising: the vehicle further comprising: an active suspension system for the vehicle having at least a pair of road engaging wheels, the suspension system having a suspension actuator coupled with each of the pairs of road engaging wheels.

17. The vehicle in accordance with claim 16 further comprising: a high travel suspension arm pivotably connected to the frame structure of the vehicle and coupled to a wheel end unit, the suspension arm coupled with the suspension actuator such of the actuator controls the position of the suspension arm relative to the frame structure.

18. The vehicle in accordance with claim 17 further comprising: the vehicle having at least four of the high travel suspension arms and actuators.

19. The vehicle in accordance with claim 18 further comprising: wherein the four high travel suspension arms and actuators are associated with the pairs of front and rear road engaging wheels.

20. The vehicle in accordance with claim 12 further comprising: wherein the body controller is configured to undertake one of the earth level orientation mode and the terrain following mode with respect to only one of a roll and pitch axis with the other of the undertaking the other of the earth level orientation mode in the terrain following mode in another of the roll and pitch axes.

* * * * *